(12) United States Patent
Lang et al.

(10) Patent No.: US 11,527,939 B2
(45) Date of Patent: Dec. 13, 2022

(54) COOLING ARRANGEMENT FOR AN ELECTRIC MACHINE, AND ELECTRIC MACHINE

(71) Applicant: ZF Friedrichshafen AG, Friedrichshafen (DE)

(72) Inventors: Martin Lang, Wegscheid (DE); Thomas Auer, Passau (DE); Sebastian Paulik, Tiefenbach (DE); Harald Wendl, Vilshofen (DE); Gerhard Obermaier, Tiefenbach (DE); Maria Lang, Hauzenberg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 389 days.

(21) Appl. No.: 16/877,989

(22) Filed: May 19, 2020

(65) Prior Publication Data

US 2020/0373815 A1 Nov. 26, 2020

(30) Foreign Application Priority Data

May 20, 2019 (DE) ...................... 10 2019 207 325.5

(51) Int. Cl.
| | |
|---|---|
| *H02K 9/00* | (2006.01) |
| *H02K 9/193* | (2006.01) |
| *H02K 7/08* | (2006.01) |
| *H02K 7/00* | (2006.01) |
| *H02K 5/173* | (2006.01) |

(52) U.S. Cl.
CPC ........... *H02K 9/193* (2013.01); *H02K 5/1732* (2013.01); *H02K 7/003* (2013.01); *H02K 7/083* (2013.01)

(58) Field of Classification Search
CPC ...... H02K 9/193; H02K 5/1732; H02K 7/003; H02K 7/083

USPC .............................................. 310/54, 61, 60 a
See application file for complete search history.

(56) References Cited

U.S. PATENT DOCUMENTS

| | | | |
|---|---|---|---|
| 3,009,072 | A | 11/1961 | Mossay |
| 4,574,210 | A | 3/1986 | Wieland |
| 9,787,164 | B2 | 10/2017 | Buttner et al. |

(Continued)

FOREIGN PATENT DOCUMENTS

| | | |
|---|---|---|
| DE | 102008043367 A1 | 5/2010 |
| DE | 102012203697 A1 | 9/2013 |
| DE | 102016216479 A1 | 3/2018 |

(Continued)

OTHER PUBLICATIONS

German Search Report DE102019207325.5, dated Jan. 23, 2020. (16 pages).

*Primary Examiner* — Terrance L Kenerly
(74) *Attorney, Agent, or Firm* — Dority & Manning, P.A.

(57) ABSTRACT

A cooling arrangement for an electric machine (1, 1*a*, 1*b*) includes a rotatably mounted rotor shaft (2). A rotatably mounted hollow shaft (11) is mounted coaxially to the rotor shaft (2) and rotationally fixed to the rotor shaft (2). A hollow shaft inner side (12) is spaced apart from a rotor shaft outer side (5) in a radial direction (R) in order to form an annular gap (14). At least one cooling duct for a cooling lubricant includes a hollow shaft duct (18), a feed duct (20), and an outlet duct (25). The feed duct (20) opens into the hollow shaft duct (18) in order to feed the cooling lubricant to the hollow shaft duct (18). The outlet duct (25) extends from the hollow shaft duct (18) to the annular gap (14) in order to release the cooling lubricant from the hollow shaft duct (18) into the annular gap (14).

15 Claims, 5 Drawing Sheets

(56) References Cited

U.S. PATENT DOCUMENTS

2008/0024020 A1   1/2008  Iund et al.
2014/0042841 A1   2/2014  Rippel et al.

FOREIGN PATENT DOCUMENTS

| DE | 102017207056 A1 | 10/2018 |
| EP | 3011663 B1 | 6/2014 |
| GB | 2552678 A | 2/2018 |
| WO | WO 2010/049244 | 5/2010 |
| WO | WO 2014/202397 | 12/2014 |
| WO | WO 2018/197192 | 11/2018 |

COOLING ARRANGEMENT FOR AN ELECTRIC MACHINE, AND ELECTRIC MACHINE

CROSS-REFERENCE TO RELATED APPLICATION

The present application is related and has right of priority to German Patent Application No. 10 2019 207 325.5 filed on May 20, 2019, which is incorporated by reference in its entirety for all purposes.

FIELD OF THE INVENTION

The invention relates generally to a cooling arrangement for a heat-generating, rotating component of an electric machine including a rotatably mounted rotor shaft, which extends in an axial direction around an axis of rotation. The rotor shaft includes a rotor shaft outer side extending in the axial direction and a first front-end and a second front-end at the ends in the axial direction. Moreover, the invention also relates generally to an electric machine and a method for an electric machine.

BACKGROUND

Electric machines including a rotor, which are mounted rotatably about a rotor shaft, and a stator, heat up during the energy conversion from electrical energy into mechanical energy, and vice versa. In order to increase the efficiency of such electric machines and to be able to operate the electric machines at higher power levels, it is necessary to cool the electric machines. It is known to design the rotor shafts of such electric machines as hollow shafts, into which and through which a cooling medium can flow. Other approaches provide a system, in the case of which the rotor shaft includes bores for cooling.

DE 10 2017207056 A1 discloses an electric machine including a stator, a rotor magnetically operating with the stator, wherein the rotor is mounted rotatably about an axis of rotation, and a shaft, on which the rotor is secured. The shaft is designed as a hollow shaft. The shaft includes a section designed as an extruded profile, and the shaft includes a first shaft end and a second shaft end. The shaft includes, as an extruded profile, at least one cooling duct, through which a cooling medium can flow.

DE 10 2012203697 A1 discloses an electric machine, in particular an induction machine, including a stator, a rotor mounted rotatably about an axis of rotation, which magnetically cooperates with the stator during the operation of the electric machine, and a shaft, on which the rotor is secured. The shaft includes an axial bore, a feed element, which extends into the axial bore in such a way that a cooling lubricant, in particular a cooling liquid, can flow out of the feed element into the axial bore.

SUMMARY OF THE INVENTION

Example aspects of the invention provide a cooling arrangement, which is improved as compared to the prior art, for cooling an electric machine, and an electric machine including such a cooling arrangement, as well as a method.

The problem is solved by a cooling arrangement for a heat-generating, rotating component of an electric machine, including:

a rotatably mounted rotor shaft, which extends in an axial direction around an axis of rotation, wherein the rotor shaft includes a rotor shaft outer side extending in the axial direction and a first front-end and a second front-end at respective ends in the axial direction;

a rotatably mounted hollow shaft, which is mounted coaxially to the rotor shaft and is rotationally fixed to the rotor shaft, including a hollow shaft inner side facing the rotor shaft outer side and, positioned opposite to the hollow shaft inner side, a hollow shaft outer side, wherein the hollow shaft inner side is arranged spaced apart from the rotor shaft outer side in a radial direction, in order to form an annular gap;

at least one cooling duct for a cooling lubricant, wherein the at least one cooling duct includes a hollow shaft duct, a feed duct, and an outlet duct;

wherein the hollow shaft duct extends between the hollow shaft inner side and the hollow shaft outer side in the axial direction;

wherein the feed duct opens into the hollow shaft duct, in order to feed the cooling lubricant to the hollow shaft duct;

and wherein the outlet duct extends from the hollow shaft duct to the annular gap, in order to release the cooling lubricant flowing through the hollow shaft duct into the annular gap.

"Axial direction" is understood to be a direction along the axis of rotation.

The hollow shaft duct is preferably centrally arranged in the hollow shaft, preferably designed as a cylindrical bore or as blind holes in the hollow shaft, which is arranged coaxially to the axis of rotation. The hollow shaft duct is designed for the through-flow of cooling lubricant. The hollow shaft duct is preferably designed as a through hole or a blind hole.

The feed duct as well as the outlet duct are each preferably designed as a cylindrical passage in the hollow shaft. The feed duct as well as the outlet duct are preferably designed as continuous bores or as blind holes. Moreover, the feed duct as well as the outlet duct are designed for the through-flow of cooling lubricant. Moreover, the feed duct as well as the outlet duct are preferably designed as a through hole or a blind hole.

The cooling arrangement is suitable, in particular, for an electric machine, which includes a heat-generating rotor, which is thermally connected to the hollow shaft. Moreover, the electric machine can also include a stator, which magnetically cooperates with the rotor during operation. During operation of such an electric machine, the rotor is set into rotation and produces waste heat.

Due to the cooling arrangement according to example aspects of the invention, waste heat, which, for example, in the rotor, which is rotationally fixed to the hollow shaft, is dissipatable. The cooling lubricant flowing through the cooling duct removes waste heat from the hollow shaft. Therefore, heat-generating components can be cooled. Liquid cooling lubricant, such as water or oil, or even cooling lubricant such as air can be utilized as cooling lubricant, in order to achieve a sufficient cooling. The proximity of the cooling lubricant to the heat-generating components provides for a very good heat dissipation by the cooling lubricant and, therefore, a longer service life of the components of the electric machine.

A contact of the cooling lubricant with portions of components, which conduct electric current during operation, is avoided with the aid of example aspects of the invention. In addition, the cooling lubricant, due to the mass of the cooling lubricant, does not adversely affect the rotation of the hollow shaft and the rotor shaft. This is the case, in particular, when a cooling liquid is used as the cooling lubricant. Moreover, a cooling can also take place already when the electric machine is not operating.

Advantageously, the hollow shaft duct extends in the axial direction in parallel to the hollow shaft outer side. In this case, "parallel" means that smaller deviations due to manufacturing can occur. Therefore, the waste heat from, for example, a rotor is particularly well dissipated.

Preferably, the hollow shaft is mounted in a housing at the particular end sides of the housing, in each case with the aid of a floating bearing or with the aid of a fixed bearing and a floating bearing.

In one advantageous embodiment, the feed duct is arranged facing the first front-end and the outlet duct is arranged facing the second front-end.

Preferably, a transmitter wheel is provided with a distribution duct, which is arranged, via a first rotor shaft-facing side, at the first front-end of the rotor shaft and is rotationally fixed to the first front-end of the rotor shaft. The transmitter wheel includes a second side, which faces away from the rotor shaft and is positioned opposite the first, rotor shaft-facing side. The distribution duct for the cooling lubricant is arranged in the transmitter wheel, and the distribution duct is open toward the second side, which faces away from the rotor shaft.

In addition, the transmitter wheel is preferably rotationally fixed to the hollow shaft. The distribution duct can be manufactured, for example, with the aid of a bore. Therefore, cooling lubricant is introduceable into the transmitter wheel from the second side. Out of the distribution duct, the cooling lubricant is subsequently distributed to the preferably multiple cooling ducts.

Preferably, the transmitter wheel includes various teeth along an outer circumference of the transmitter wheel. As a result, with the aid, for example, of a Hall sensor or an inductive sensor and a magnet, the magnetic field changes induced by the teeth is registerable, whereby pieces of information, such as rotational speed and direction of rotation of the transmitter wheel and/or of the rotor shaft, to which the transmitter wheel is rotationally fixed, are deliverable.

Preferably, a rotationally fixed bearing cover is provided, which is arranged on a side of the transmitter wheel facing away from the rotor shaft and partially encompasses the transmitter wheel. The bearing cover includes a passage extending in the axial direction and adjacent to the distribution duct. A hydraulic connecting element, in particular a bush, and a hydraulic element, in particular a hydraulic screw connection, are provided. The hydraulic connecting element is arranged in the passage, and the hydraulic element is connected, in particular clamped, to the hydraulic connecting element, so that the hydraulic element, via the hydraulic connecting element, forms a fluid connection with the distribution duct. Particularly preferably, the hydraulic element is designed to be L-shaped. As a result, further components are connectable in the axial direction. Therefore, a hydraulic oil line can be utilized as, for example, an oil line.

Alternatively, a rotationally fixed bearing cover is provided, which is arranged on a side of the transmitter wheel facing away from the rotor shaft. The bearing cover includes a continuous, L-shaped bearing cover duct, in particular a bearing cover bore, which is fluidically connected to the distribution duct, so that an inflow of the cooling lubricant via the bearing cover duct into the distribution duct can be brought about.

In order to improve the inflow of cooling lubricant, for example, oil, a hydraulic screw connection can be arranged in the bearing cover bore.

Therefore, the cooling lubricant is flowable via the bearing cover into the distribution duct. Preferably, an annular recess is provided, which is arranged between the bearing cover and the transmitter wheel. It is further preferred that an annular seal is arranged in the annular recess. The seal prevents cooling lubricant from leaking between the transmitter wheel and the bearing cover. The seal can be designed as a radial seal or as a seal including a baffle plate.

Preferably, the feed duct includes a first feed duct section and a second feed duct section, which is directly adjacent to the first feed duct section. The first feed duct section extends from the distribution duct of the transmitter wheel up to the second feed duct section, and the second feed duct section extends from the first feed duct section to the hollow shaft duct, so that an inflow of the cooling lubricant from the distribution duct via the first feed duct section and the second feed duct section into the hollow shaft duct can be brought about.

In this case, "extends" means that the first feed duct section and the second feed duct section adjoin each other in such a way that the cooling lubricant is flowable from the first feed duct section into the second feed duct section. Therefore, a simple feeding of cooling lubricant to the hollow shaft duct is possible. The cooling lubricant already absorbs waste heat from, for example, the rotor, while flowing through the feed duct, so that a heat dissipation also takes place here.

Preferably, the feed duct is designed as a continuous bore through the transmitter wheel and the hollow shaft. The bore intersects the hollow shaft duct at a first point of intersection so that an inflow of the cooling lubricant from the feed duct into the hollow shaft duct can be brought about. The continuous bore includes a seal, preferably a sealing plug, so that a cooling lubricant leak at the hollow shaft outer side is avoidable.

The bore therefore includes the seal in the proximity of the hollow shaft outer wall, so that the entirety of the cooling lubricant flowing into the feed duct is directed into the hollow shaft duct, and no leakage of cooling lubricant at the hollow shaft outer side takes place. Therefore, a simple manufacture of the feed duct can be brought about. Alternatively, the second feed duct section can also be designed as a blind hole. Thereupon, a sealing plug can be dispensed with.

Preferably, the first point of intersection therefore acts as a deflection. Therefore, a simple deflection of the cooling lubricant is to be brought about.

Advantageously, the feed duct intersects the hollow shaft duct at the first point of intersection at an obtuse angle. Therefore, the cooling lubricant flowing into the hollow shaft duct through the feed duct can form a flow that is as turbulence-free as possible.

Preferably, the outlet duct is designed as a continuous bore through the hollow shaft, wherein the bore intersects the hollow shaft duct at a second point of intersection, so that an inflow of the cooling lubricant from the hollow shaft duct via the outlet duct into the annular gap can be brought about. The continuous bore includes a seal, preferably a sealing plug, so that a cooling lubricant leak at the hollow shaft outer side is avoidable. As a result, a simple manufacture of the outlet duct is possible. Alternatively, the outlet duct can also be designed as a blind hole. As a result, a sealing plug can be dispensed with.

Preferably, an inflow of the cooling lubricant from the hollow shaft duct into the outlet duct and, thereafter, into the annular gap can therefore be brought about via the second point of intersection. The second point of intersection therefore acts as a deflection. Therefore, a simple deflection of the cooling lubricant is to be brought about.

In one advantageous example embodiment, the outlet duct intersects the hollow shaft duct at the second point of intersection at an obtuse angle. Therefore, the cooling lubricant flowing into the outlet duct through the hollow shaft duct can form a flow that is as turbulence-free as possible.

Preferably, multiple cooling ducts are provided, which are distributed over a circumference of the hollow shaft, spaced equidistantly from one another. In this case, "multiple" means at least two cooling ducts. Therefore, a uniform heat dissipation, for example from the rotor, can therefore be achieved.

Preferably, the hollow shaft outer side includes a cylindrical lateral surface, whereby a good heat dissipation of a heat-generating component coaxially mounted on the hollow shaft results.

In one preferred example embodiment, the hollow shaft outer side includes a cylindrical lateral surface including multiple longitudinal grooves, which are arranged in parallel to one another and extend along the axial direction. Due to the longitudinal grooves, an essentially star-shaped form of the hollow shaft results. As a result, a good heat dissipation arises at a contact surface between the hollow shaft outer side and, for example, the rotor, as well as a good heat dissipation to the cooling lubricant at the longitudinal grooves due to thermal radiation.

Advantageously, an inner side of the hollow shaft duct and/or of the feed duct and/or of the outlet duct is structured and/or coated. Preferably, the structure is a grooved structure. Therefore, a laminar flow can be formed. Turbulences, which can disrupt the rotation of the rotor shaft and the hollow shaft, are therefore avoided. Therefore, a more efficient cooling can be achieved.

Preferably, a radial recess is provided between the transmitter wheel and the bearing cover. It is further preferred when a seal, for example, a shaft seal or a combination of a sealing ring and a baffle plate, is provided in this recess. Therefore, an outflow of the cooling lubricant can be prevented. As a result, a penetration of the cooling lubricant into, for example, the floating bearing or to the rotor/stator can be avoided.

In one preferred example embodiment, the hollow shaft duct is designed as a continuous bore, wherein the bore includes a seal, preferably a sealing plug, at both ends, in order to seal against an end-side outflow of the cooling lubricant. Alternatively, the bore can be designed as a blind hole. As a result, one of the two sealing plugs can be dispensed with.

Preferably, the cooling lubricant is designed as oil. Oil is particularly well suited, since it can absorb the waste heat very well and, simultaneously, is suitable as a very good lubricant. In addition, oil has the advantage that it is electrically non-conductive.

Preferably, a housing and a cooling lubricant sump are provided, in particular an oil sump, wherein the cooling lubricant sump is arranged in the housing. In order to guide the cooling lubricant from the cooling lubricant sump via hydraulic lines to the bearing cover and the distribution duct, a cooling lubricant pump, in particular a hydraulic pump, is preferably provided in the cooling lubricant line. Optionally or, alternatively, in addition, a feed pump can also be provided in the cooling lubricant sump.

Heat exchangers for cooling the cooling lubricant can be provided within the hydraulic lines, so that a better heat absorption of the cooling lubricant and, therefore, a better heat dissipation of heat-generating components is possible.

In addition, a return duct is provided, which extends between the annular gap and the cooling lubricant sump, in order to return the cooling lubricant out of the annular gap into the cooling lubricant sump.

Therefore, the cooling lubricant can be used again for cooling. As a result, a closed cooling circuit results.

Moreover, example aspects of the present invention provide an electric machine including a cooling arrangement of the type described above. The electric machine includes a rotor, which is mounted coaxially to the hollow shaft and is rotationally fixed to the hollow shaft. Preferably, the rotationally fixed connection is designed as a press-fit connection between the rotor and the hollow shaft outer side. Due to the connection, waste heat is conducted to the hollow shaft during operation. The waste heat is dissipated by the cooling lubricant flowing through the cooling ducts. After introduction of the cooling lubricant into the cooling duct, the cooling lubricant absorbs the waste heat of the rotor.

Due to the cooling lubricant flowing along in the annular gap, a separate lubrication of teeth that protrude into the annular gap can be dispensed with.

Moreover, example aspects of the present invention provide a method for implementing a cooling of a rotor in an electric machine of the type described above, including:
  guiding cooling lubricant out of a cooling lubricant sump with the aid of a cooling lubricant line to the bearing cover;
  flowing the cooling lubricant into the distribution duct via the bearing cover;
  flowing the cooling lubricant through the distribution duct to the at least one cooling duct;
  flowing the cooling lubricant into the at least one cooling duct, which is fluidically connected to the distribution duct, and flowing the cooling lubricant through the at least one cooling duct to the annular gap;
  flowing the cooling lubricant into the annular gap, which is fluidically connected to the at least one cooling duct, and flowing the cooling lubricant through the annular gap to a return duct; and
  flowing the cooling lubricant into the return duct and guiding the cooling lubricant to the cooling lubricant sump fluidically connected to the return duct.

Due to example aspects of the invention, the waste heat of such an electric machine can be well dissipated. Therefore, the electric machine can be operated at high power levels. Thermally loaded components, such as floating bearings, can therefore be cooled. As a result, the service life of such components is increased. With the aid of example aspects of the invention, it is possible to cool an electric machine without damaging the individual components. In addition, the power of the electric machine can be increased due to the better dissipation of the waste heat.

BRIEF DESCRIPTION OF THE DRAWINGS

Further features, properties, and advantages of the present invention result from the following description with reference to the attached figures. Schematically.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Although the invention was illustrated and described in greater detail in detail with the aid of the preferred exemplary embodiments, the invention is not limited by the disclosed examples. Variations therefrom can be derived by a person skilled in the art without departing from the scope of protection of the invention, as it is defined by the following claims.

Figure 1:
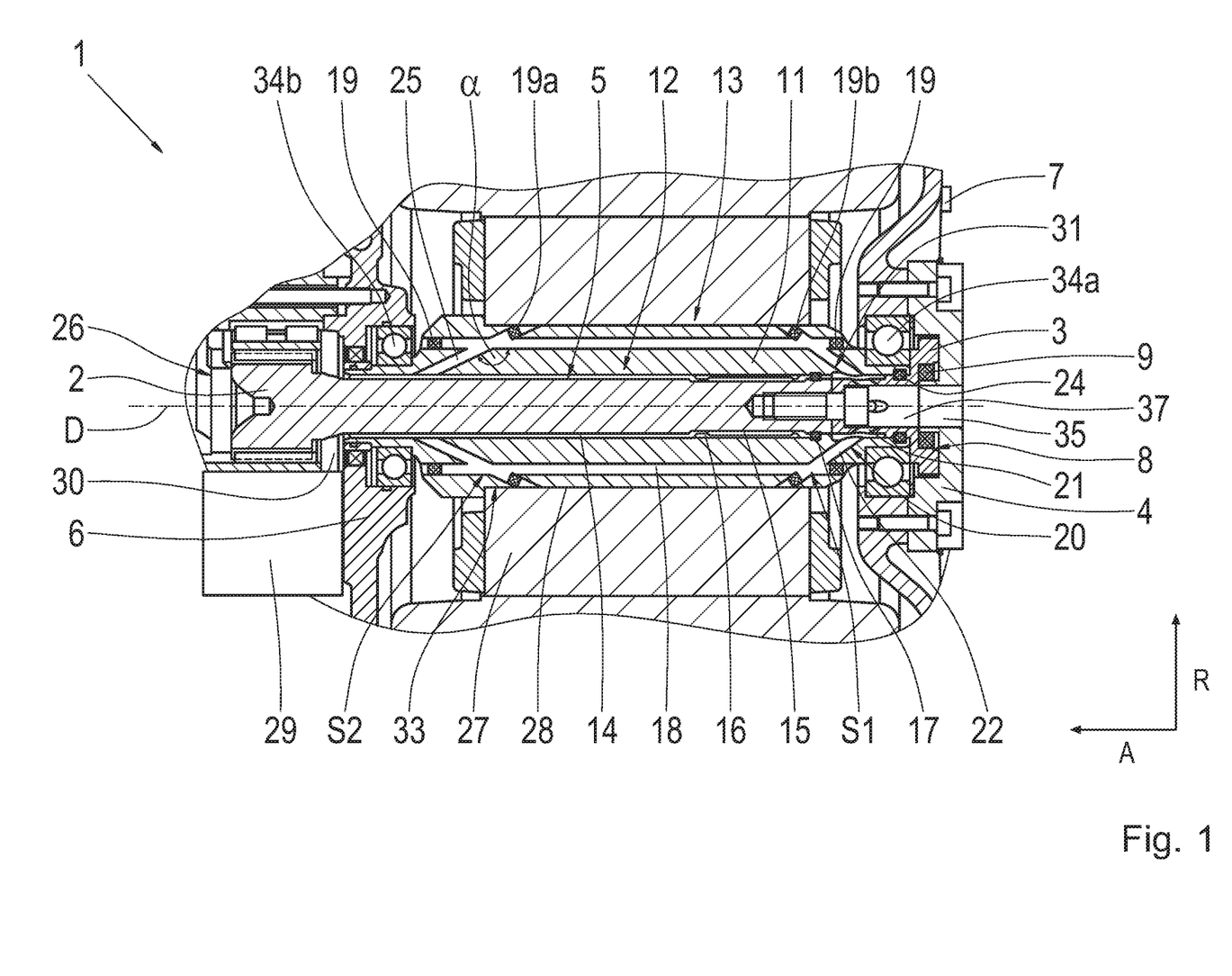
FIG. 1 shows a first embodiment of an electric machine according to example aspects of the invention.

FIG. 1 shows a first embodiment of an electric machine 1 according to example aspects of the invention.

The electric machine 1 includes a rotor shaft 2 in a housing 6, which extends in an axial direction A around an axis of rotational D. The rotor shaft 2 includes, along the axial direction A, a rotor shaft outer side 5, a first end-side front-end 31, and a second end-side front-end 26.

The rotor shaft 1 is rotationally fixed, at the first front-end 31, to a transmitter wheel 3. The transmitter wheel 3 is arranged coaxially to the axis of rotation D.

The transmitter wheel 3 includes, preferably along the outer circumference of the transmitter wheel 3, various teeth (not shown) and a Hall sensor or an inductive sensor (not shown). When a transmitter wheel 3 with teeth is moved past the Hall sensor or the inductive sensor (not shown), in the proximity of which a magnet is located, the Hall sensor or the inductive sensor can register the magnetic field changes induced by the teeth and, in this way, deliver pieces of information regarding the rotational position of the transmitter wheel 3 and/or of the rotor shaft 2 connected to the transmitter wheel 3. Alternatively, the teeth (not shown) can be provided, for example, with a marking, which can be detected by a sensor (not shown) designed therefor.

The transmitter wheel 3 is connected to the rotor shaft 2 in force-locking manner. The transmitter wheel 3 is arranged, via a first rotor shaft-facing side, at the first front-end 20 of the rotor shaft 2 and is rotationally fixed thereto. Moreover, the transmitter wheel 3 includes a second side, which faces away from the rotor shaft and is positioned opposite the first rotor shaft-facing side.

A distribution duct 37 for the cooling lubricant, which is open toward the second side, which faces away from the rotor shaft, is arranged in the transmitter wheel 3.

The distribution duct 37 is therefore arranged in the transmitter wheel 3. The distribution duct 37 does not extend continuously from the second side, which faces away from the rotor shaft, as an open inlet side into the transmitter wheel 3.

The rotor shaft 2 and the transmitter wheel 3 are covered by a (rotationally) fixed bearing cover 4. The bearing cover 4 preferably includes a load-bearing region, which corresponds to the rotor shaft 2 and the transmitter wheel 3, as well as mounting regions for connecting the bearing cover 4 to the housing 6, for example, with the aid of screws 7. The bearing cover 4 absorbs forces during the rotation of the transmitter wheel 3 and the rotation of the rotor shaft 2.

Moreover, the bearing cover 4 includes at least one continuous through-duct 35 for the oil. The through-duct 35 extends, here, continuously in the axial direction A through the bearing cover 4. In particular, the through-duct 35 is designed as a bore through the bearing cover 4. The cooling lubricant is preferably designed as an oil in this case.

The through-duct 35 is designed for guiding, preferably for the flow-free guidance (laminar flow), of the oil. For this purpose, the through-duct 35 can include a coating on the inner side of the through-duct 35. This can be, for example, a grooved structure arranged in the axial direction A, which is easily formed with the aid of a bore. Such a grooved structure prevents turbulences in the flow.

The through-duct 35 continues in the distribution duct 37, which is arranged in the transmitter wheel 3. The distribution duct 37 is not continuous. Via the through-duct 35, oil can flow into the distribution duct 37, which is arranged in the transmitter wheel 3. From there, the oil is distributed to the individual cooling ducts, as described further below. The transmitter wheel 3 therefore acts as an oil distribution point.

Moreover, an annular recess 8 is provided, which is arranged between the bearing cover 4 and the transmitter wheel 3 in the direction of the axis of rotation D. An annular seal 9 is arranged in the annular recess 8. This means, the annular recess 8 extends between the transmitter wheel 3 and the bearing cover 4 in a radial direction R. The seal 9 can include, for example, a radial shaft seal or a sealing ring in combination with a baffle plate. The seal 9 prevents the leakage of oil between the transmitter wheel 3 and the bearing cover 4, i.e., between the through-duct 35 and the distribution duct 37.

Moreover, a hollow shaft 11 extending in the axial direction A around the axis of rotation D is provided. The hollow shaft 11 is arranged coaxially to the rotor shaft 2. The hollow shaft 11 includes a hollow shaft inner side 12, which faces the rotor shaft 2, and a hollow shaft outer side 13, which is positioned opposite the hollow shaft inner side 12. The hollow shaft inner side 12 is arranged spaced apart, in the radial direction R, from the rotor shaft outer side 5. The hollow shaft 11 is mounted in the housing 6, at each end with the aid of a bearing, in particular a grease lubricated floating bearing 34b and a grease lubricated fixed bearing 34a.

The hollow shaft inner side 12 forms, together with the rotor shaft outer side 5, an annular gap 14 due to the radial spacing.

The hollow shaft 11 or the hollow shaft inner side 12 at least partially surrounds the transmitter wheel 3 in the axial direction A. The hollow shaft 11 or the hollow shaft inner side 12 only partially surrounds the rotor shaft 2 or the rotor shaft outer side 5 in the axial direction A, however.

A circumferential first driving toothing 15 is arranged at the first front-end 31 of the rotor shaft 2, wherein the first driving toothing 15 extends over a predefined first toothing section. The first toothing section preferably does not extend up to the transmitter wheel 3, however.

Corresponding to the first toothing section, the hollow shaft inner side 12 includes a second toothing section, which is positioned opposite the first toothing section. Corresponding to the first driving toothing, a second circumferential driving toothing 16 is arranged on the hollow shaft inner side 12 and is in engagement with the first driving toothing 15. The rotor shaft 2 and the hollow shaft 11 are rotationally fixed with the aid of the first driving toothing 15 and the second driving toothing 16. Axially downstream from the driving toothings 15, 16 in the direction of the transmitter wheel 3, i.e., in the direction of the first front-end 31, a first sealing ring 17, preferably a first O-ring, is arranged in the annular gap 14 in order to seal against the further flow of the oil in this direction. Therefore, oil is prevented from flowing from the annular gap 14 in/to further components of the electric machine 1 and damaging these.

The hollow shaft 11 includes multiple cooling ducts including multiple hollow shaft ducts 18, which extend between the hollow shaft inner side 12 and the hollow shaft outer side 13 preferably in parallel to the axis of rotation D. In this exemplary embodiment, the hollow shaft ducts 18 extend in the axial direction A continuously through the hollow shaft 11. The hollow shaft ducts 18 are preferably designed as continuous bores. A plug, preferably a sealing plug 19, which prevents an end-side leakage of oil, is arranged at each end of each of the hollow shaft ducts 18. The hollow shaft ducts 18 are designed for guiding, preferably for the flow-free guidance (laminar flow), of the oil.

For this purpose, the hollow shaft ducts 18 can be designed including grooves on their inner side, in order to prevent turbulences. Such a grooved structure is easy to manufacture with the aid of a bore. The hollow shaft ducts 18 can be uniformly distributed over a circumference of the hollow shaft 11.

Moreover, feed ducts 20, each of which faces the first front-end 31, are provided for feeding the oil to the hollow shaft ducts 18. Such a feed duct 20 splits into a first feed duct section 21 and into a second feed duct section 22, which are directly adjacent to each other, in order to allow the oil to flow through. The first feed duct section 21, as a continuous duct, for example, a bore, is arranged in the transmitter wheel 3, and opens into the distribution duct 37 of the transmitter wheel 3, so that the oil from the distribution duct 37 is flowable into the first feed duct section 21. The second feed duct section 22 is designed as a continuous duct from the hollow shaft outer side 13 up to the hollow shaft inner side 12.

The feed duct 20 can be designed as a continuous bore, which extends from the hollow shaft outer side 13 into the distribution duct 37.

In order to establish a preferably laminar flow of the oil, the feed duct 20 can include a coating or grooves as a structure, for example on the inner side of the feed duct 20.

The second feed duct section 22 is arranged in such a way that the second feed duct section 22 intersects the hollow shaft duct 18 at a first point of intersection S1, so that the oil from the distribution duct 37 is flowable through the first feed duct section 21 into the second feed duct section 22 and, from there, via the first point of intersection S1, into the hollow shaft duct 18. A seal, preferably a sealing plug 19*b*, which prevents the outflow of oil in the direction of the hollow shaft outer side 13, is arranged in the second feed duct section 22, downstream from the first point of intersection S1 in the direction of the hollow shaft outer side 13.

A second sealing ring 24, preferably in O-ring, is arranged between the transmitter wheel 3 and the hollow shaft inner side 12 in the direction of the bearing cover 4, in order to prevent an uncontrolled outflow of oil, for the protection, for example, of the fixed bearing 34*a* or other components. Other sealing rings or sets of seals can also be utilized in place of the O-ring.

One feed duct 20 is provided for each hollow shaft duct 18. The feed duct 20 and the hollow shaft duct 18 preferably form, at the first point of intersection S1, an obtuse angle α with respect to each other, so that no or only slight turbulences arise during the through-flow of the oil.

Moreover, an outlet duct 25, which faces the second front-end 26 in each case, is provided for the outflow of the oil from the hollow shaft duct 18. Such an outlet duct 25 extends from the hollow shaft duct 18 up to the annular gap 14.

The outlet duct 25 extends continuously from the hollow shaft outer side 13 up to the hollow shaft inner side 12. The outlet duct 25 intersects a corresponding hollow shaft duct 18 at a second point of intersection S2. A sealing plug 19*a*, which prevents an outflow of oil in this direction, is arranged in the outlet duct 25, downstream from the second point of intersection S2 in the direction of the hollow shaft outer side 13. The outlet duct 25 preferably forms an obtuse angle α with the hollow shaft duct 18, so that no or only slight turbulences arise during the through-flow of oil.

The outlet duct 25 opens into the annular gap 14 between the rotor shaft 2 and the hollow shaft 11, in order to release the oil into the annular gap 14.

Therefore, the oil can flow from the transmitter wheel 3 via the feed duct 20 into the hollow shaft duct 18, through the hollow shaft duct 18 and into the outlet duct 25, and through the outlet duct 25 into the annular gap 14. The outlet ducts 25 can be designed as a bore and can be provided, on the inner side, with a coating or a structuring in order to form a laminar flow.

Moreover, a rotor 27 is provided, which is mounted rotatably about the axis of rotation D and which is rotationally fixed to the hollow shaft 11 with the aid of a press-fit connection 28.

In addition, a stator (not shown) is provided, which is secured in the housing 6 and preferably magnetically cooperates with the rotor 27.

The housing 6 also includes an oil sump 29. A pressure-generating oil pump (not shown) delivers, via a hydraulic line (not shown), the oil out of the oil sump 29 to the bearing cover 4 and, via a hydraulic screw connection (not shown), into the through-duct 35, wherein an oil filter (not shown) can be provided in the hydraulic line (not shown).

Oil is therefore pumped from the oil sump 29 via the pressure-generating oil pump (not shown) to the bearing cover 4 and into the through-duct 35. From there, it flows into the distribution duct 37 and, as a result, forms an oil distribution point.

Via the distribution duct 37, the oil flows into the feed ducts 20 and, from there, further into the hollow shaft ducts 18. The oil flows through the hollow shaft ducts 18 up to the outlet ducts 25, into the outlet ducts 25 and through the outlet ducts 25.

In the cooling duct 18, the oil heats up due to the waste heat of the rotor 27 and therefore cools the rotor 27 down.

Via the outlet ducts 25, the oil enters the annular gap 14 between the rotor shaft 2 and the hollow shaft 11 and flows along the annular gap 14. From there, the oil returns into the oil sump 29 via a return duct 30. Therefore, the oil is available for further cooling.

In the annular gap 14, the oil is utilized for lubricating teeth that protrude into the annular gap 14. Therefore, a separate lubrication of these teeth can be dispensed with.

Therefore, a heat exchange takes place. The rotor 27 gives off a portion of the waste heat of the rotor 27 to the oil flowing through. Due to the direct proximity of the oil to the rotor 27, an efficient cooling takes place.

Due to the proximity of the oil to the rotor 27, an optimal heat dissipation takes place despite a small quantity of oil that is utilized. Due to the small quantity of oil as cooling lubricant, there is only a minimal increase of the moving mass and, therefore, of the moment of inertia.

As a result, a closed cooling circuit is produced. Due to the use of oil, therefore, the driving toothing 15, 16 can also be lubricated, and so a separate oil feed can be dispensed with.

Therefore, a closed cooling circuit can be provided, which can be cost-effectively and easily produced.

Figure 2:
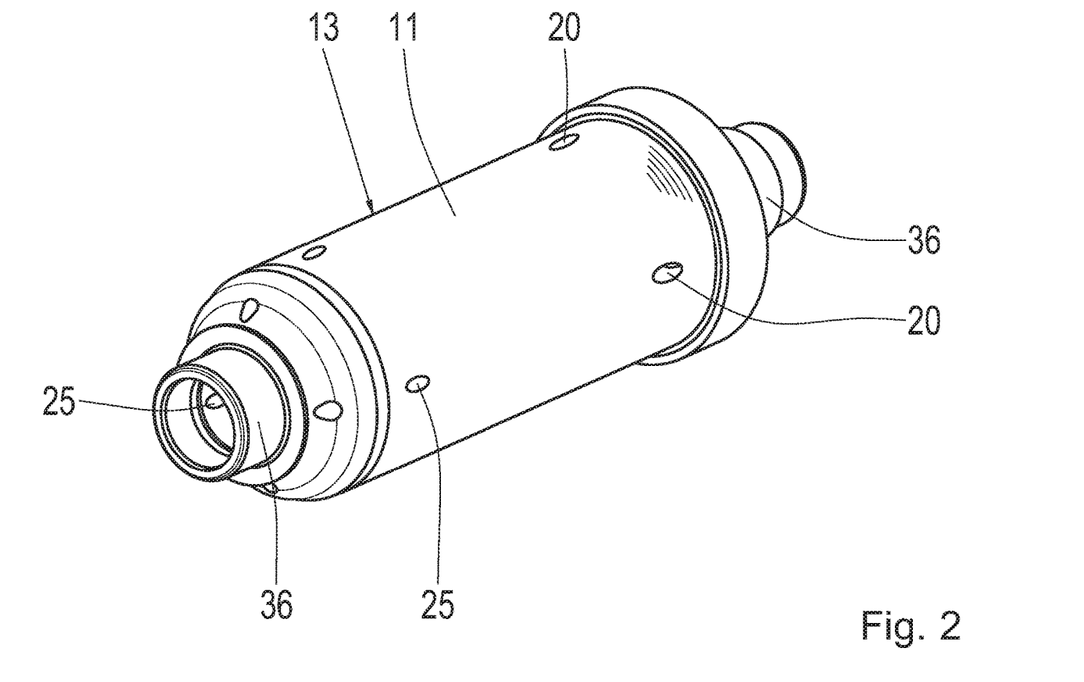
FIG. 2 shows a first example embodiment of a hollow shaft of the invention.

FIG. 2 shows a first example embodiment of the hollow shaft 11. The hollow shaft 11 includes a cylindrical hollow shaft inner side 12 (FIG. 1). Moreover, the hollow shaft outer side 13 includes a cylindrical lateral surface. Mounting sections 36 are arranged at each end of the hollow shaft 11.

Moreover, the hollow shaft 11 includes multiple hollow shaft ducts 18 (FIG. 1), which, in this case, are arranged symmetrically distributed over the circumference of the hollow shaft 11. The hollow shaft ducts 18 are designed as individual continuous bores in this case.

The hollow shaft ducts 18 (FIG. 1) can include wall grooves on inner sides of the hollow shaft ducts 18, along the flow direction of the oil, i.e., in the axial direction. The grooves are preferably arranged in parallel to one another and have a constant width and height. Moreover, optionally or, alternatively, in addition, a coating of the inner side of the hollow shaft ducts 18 (FIG. 1) can be provided. Therefore, a laminar flow of the oil can be achieved without or with little pressure loss.

Moreover, outlet ducts 25, which each intersect the hollow shaft ducts 18 at a point S2 (FIG. 1), and feed ducts 20, which each intersect the hollow shaft ducts 18 at a point S2 (FIG. 1), are provided, wherein the inner side of the outlet ducts 25 and the feed ducts 20 can be designed including grooves or a coating, similarly to the inner side of the hollow shaft ducts 18. The outlet ducts 25 as well as the feed ducts 20 are designed as a bore in this case.

By way of the hollow shaft outer side 13, a contact surface 33 (FIG. 1) to the rotor 27 (FIG. 1) is established. As a result, the rotor 27 (FIG. 1) can conduct the arising waste heat to the oil flowing through or to the cooling lubricant flowing through. As a result, an efficient cooling of the rotor 27 (FIG. 1) results.

Figure 3:
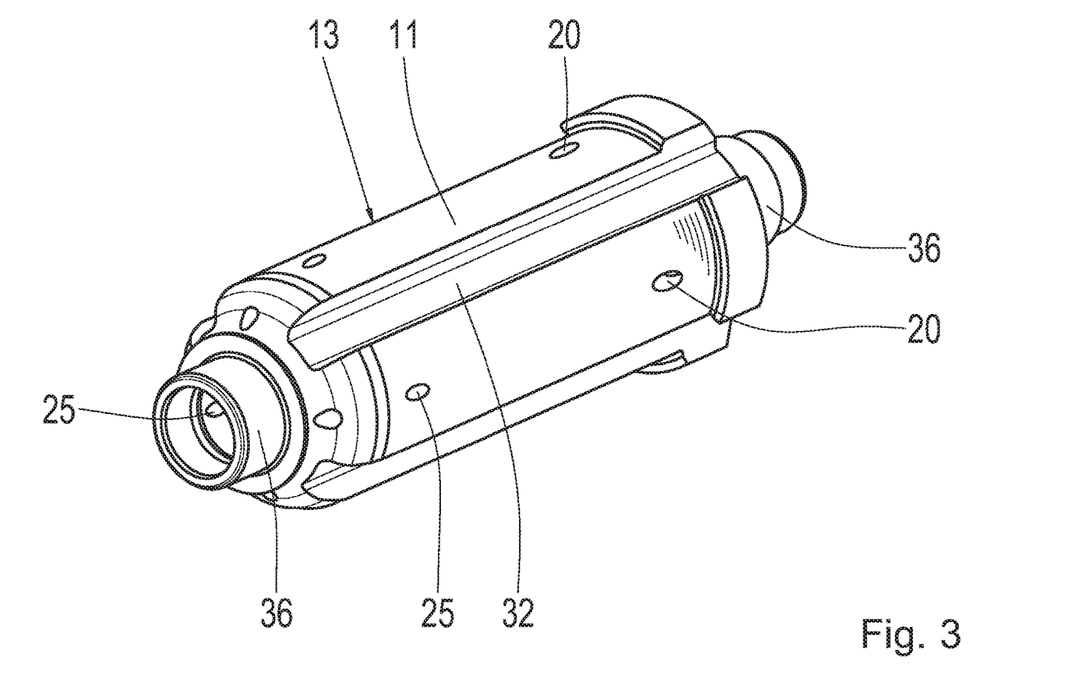
FIG. 3 shows the hollow shaft comprising longitudinal grooves.

FIG. 3 shows the hollow shaft 11 from FIG. 2 in an example embodiment including longitudinal grooves 32. The hollow shaft 11 incudes the cylindrical hollow shaft inner side 12 and the hollow shaft outer side 13. The hollow shaft outer side 13 includes the cylindrical lateral surface including multiple longitudinal grooves 32, which are arranged in parallel to one another and extend along the axial direction A (FIG. 1).

The longitudinal grooves 32 are uniformly distributed over a circumference of the hollow shaft 11 and have identical dimensions, such as depth or width. Due to the longitudinal grooves 32, the outer surface of the hollow shaft 11 is enlarged. In an embodiment including longitudinal grooves 32, the surface is larger due to the surfaces of the sides of the longitudinal grooves.

As a result, a good heat dissipation of the waste heat from the rotor 27 (FIG. 1) to the oil in the hollow shaft ducts 18 (FIG. 1) results, on the one hand, due to the heat dissipation at the direct contact surfaces 33 (FIG. 1) between the rotor 27 (FIG. 1) and the hollow shaft 1. On the other hand, a good heat dissipation of the waste heat from the rotor 27 (FIG. 1) to the oil in the hollow shaft ducts 18 also results due to thermal radiation in the longitudinal grooves 32.

The longitudinal grooves 32 can be at least partially filled with a heat transfer compound for better heat transfer.

Figure 4:
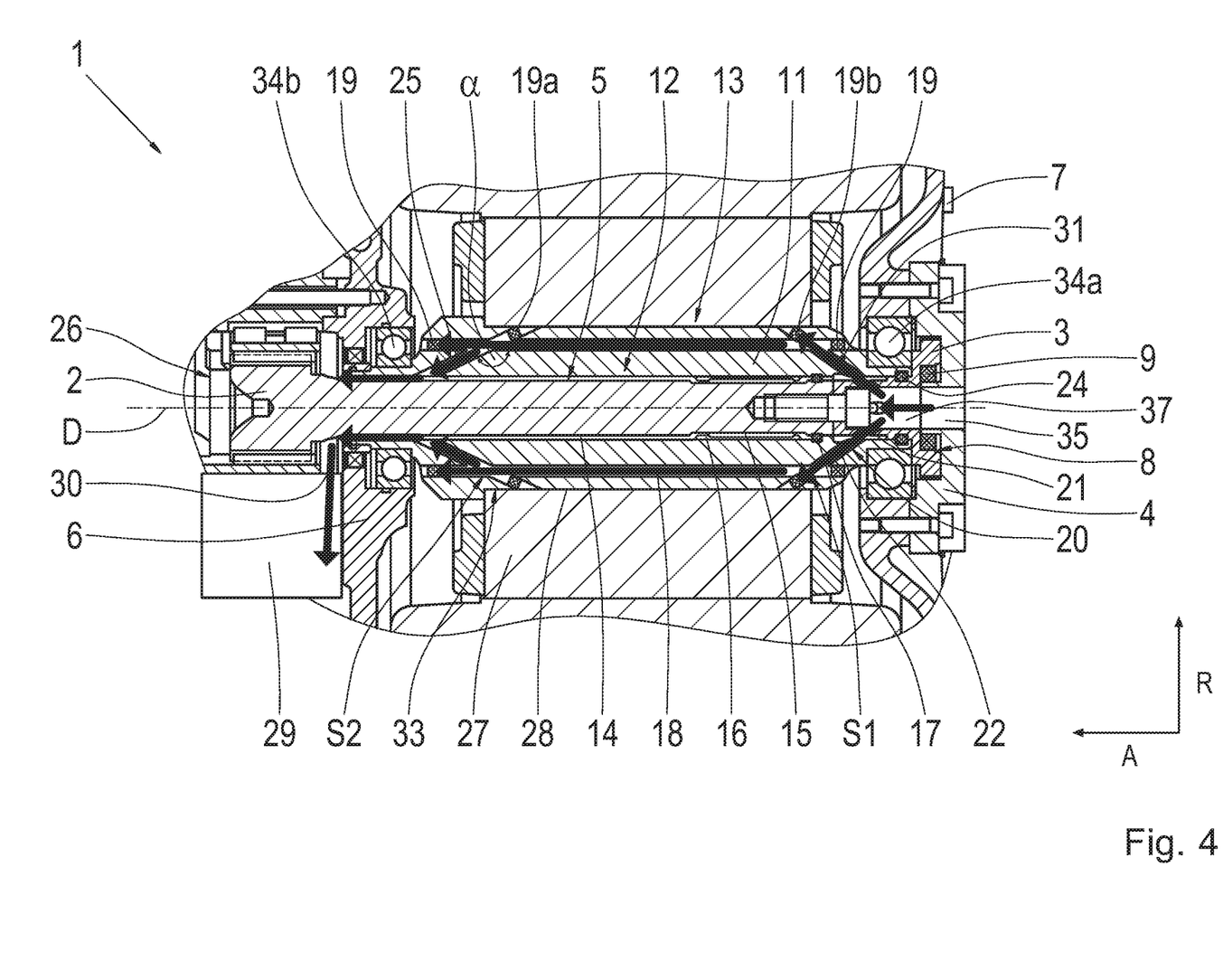
FIG. 4 shows, by way of example, an electric machine according to example aspects of the invention, during operation.

FIG. 4 shows an electric machine 1 according to example aspects of the invention, during operation.

Initially, oil is pumped out of the oil sump 29 with the aid of a hydraulic pump (not shown) to the bearing cover 4 and is pumped into the through-duct 35.

Thereafter, the oil can flow through the through-duct 35 into the non-continuous distribution duct 37, which is arranged in the transmitter wheel 3, and, there, forms the oil distribution point. From the oil distribution point, the oil is pumped through the feed ducts 20 into the hollow shaft ducts 18. There, the oil is heated by the waste heat of the rotor 27, whereby the rotor 27 is cooled.

After flowing through the hollow shaft ducts 18, the oil is directed through the outlet ducts 25 into the annular gap 14 and flows along the annular gap 14 up to the end. Thereafter, the oil is conducted into the oil sump 29 again, through a return duct 30.

As a result, a good cooling capacity is achieved, by utilizing a minimal oil consumption.

Figure 5:
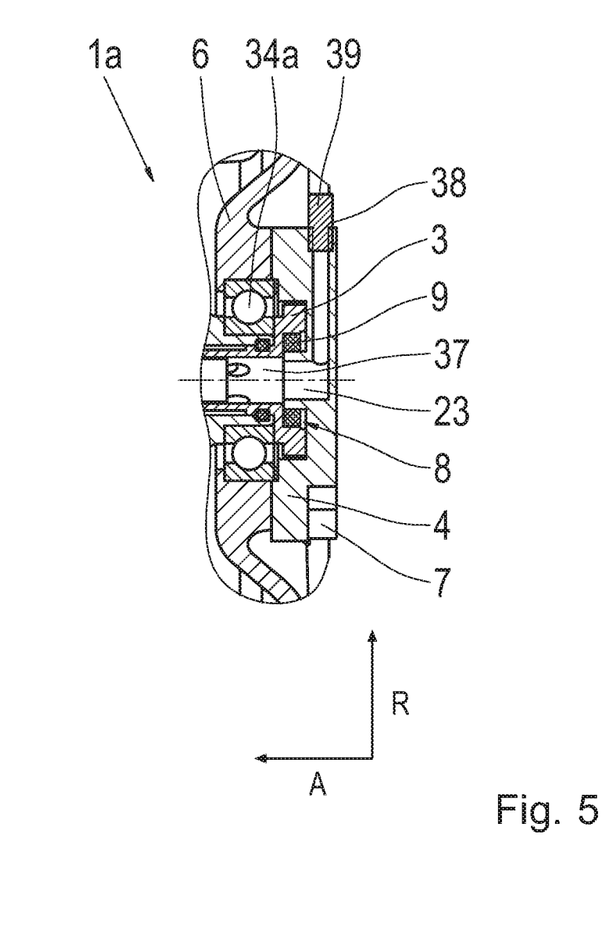
FIG. 5 shows a second embodiment of an electric machine according to example aspects of the invention.

FIG. 5 shows a subsection of one further example embodiment of an electric machine 1a of the invention. The same reference signs as in the preceding figures identify identical elements.

In this exemplary embodiment, a right-angled, L-shaped bearing cover bore 23 is arranged in the bearing cover 4, as an inlet. Therefore, for example, the oil feed can be simply configured if components directly adjoin the bearing cover 4 in the axial direction A. The bearing cover bore 23 is arranged directly in the bearing cover 4.

The bearing cover bore 23 extends from a lateral surface 38 of the bearing cover 4 up to the distribution duct 37 and, therewith, forms a fluid connection. As a result, oil can be introduced into the bearing cover bore 23 via oil lines and, thereafter, flows via the bearing cover bore 23 to the distribution duct 37. Since the bearing cover bore 23 is integrated in the bearing cover 4, further components can be arranged on the front-end of the bearing cover 4. Moreover, installation space can therefore be saved in the axial direction A. Therefore, an inflow of the oil from the bearing cover bore 23 into the distribution duct 37 can be easily brought about.

In order to simplify the connection of the oil lines to the bearing cover bore 23, a connecting element is arranged at the bearing cover bore 23, which is designed as a hydraulic screw connection 39 in this case, wherein the hydraulic screw connection 39 is partially introduced in the bearing cover bore 23. For this purpose, the bearing cover bore 23 includes an internal thread and the hydraulic screw connection 39 includes the corresponding external thread. The bearing cover bore 23 can have an adapted, enlarged diameter in the area of the internal thread.

Figure 6:
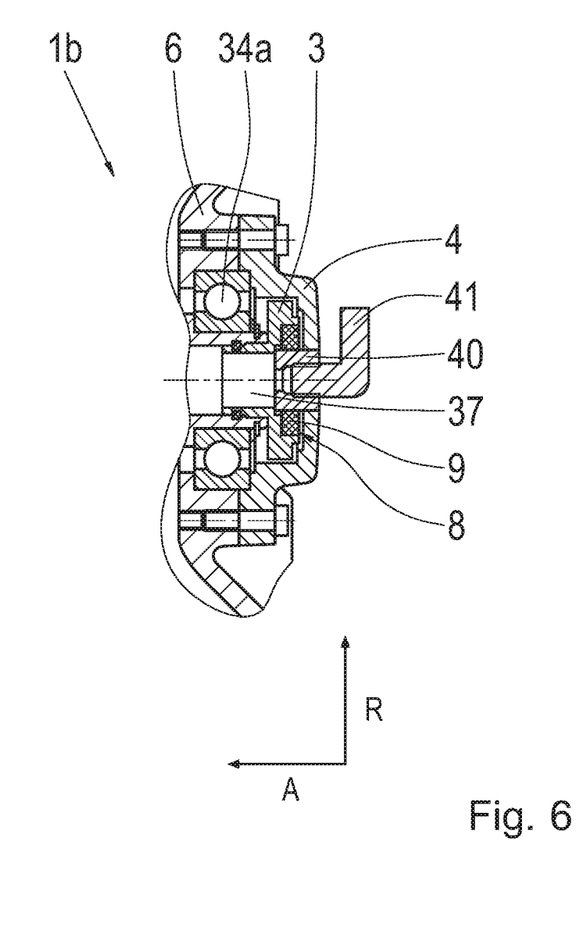
FIG. 6 shows a second embodiment of an electric machine according to example aspects of the invention.

FIG. 6 shows a subsection of one further example embodiment of an electric machine 1b of the invention. The same reference signs as in the preceding figures identify identical elements.

The bearing cover 4 includes a passage, which opens into the distribution duct 37 in the axial direction A. The passage can be designed as a cylindrical bore in the axial direction A, which is followed by the distribution duct 37. A hydraulic connecting element 40, in particular a bush, is arranged in the passage, for the connection of a hydraulic element 41. Preferably, the hydraulic element 41 is designed as a hydraulic screw connection.

In particular, the hydraulic connecting element 40, for example, the bush, is introduced in the passage in a force-locking manner.

The hydraulic element 41, together with the hydraulic connecting element 40, forms the inlet, so that oil can flow into the distribution duct 37. It is further preferred when the hydraulic element 41 is bent in an L-shape. Therefore, even further components can be arranged at the bearing cover 4 in the axial direction A. The hydraulic element 41 acts as a deflection for a hydraulic line, which, in this case, extends from an oil sump 29 to the hydraulic screw connection. The hydraulic line is screwed in the hydraulic element 41, or is attached in an alternative manner. As a result, a simple deflection of the oil from the oil sump 29 into the hydraulic element 41 can be brought about.

Due to the hydraulic element 41, the oil can be easily guided via the hydraulic connecting element 40 from the oil sump 29 to the distribution duct 37.

Figure 7:
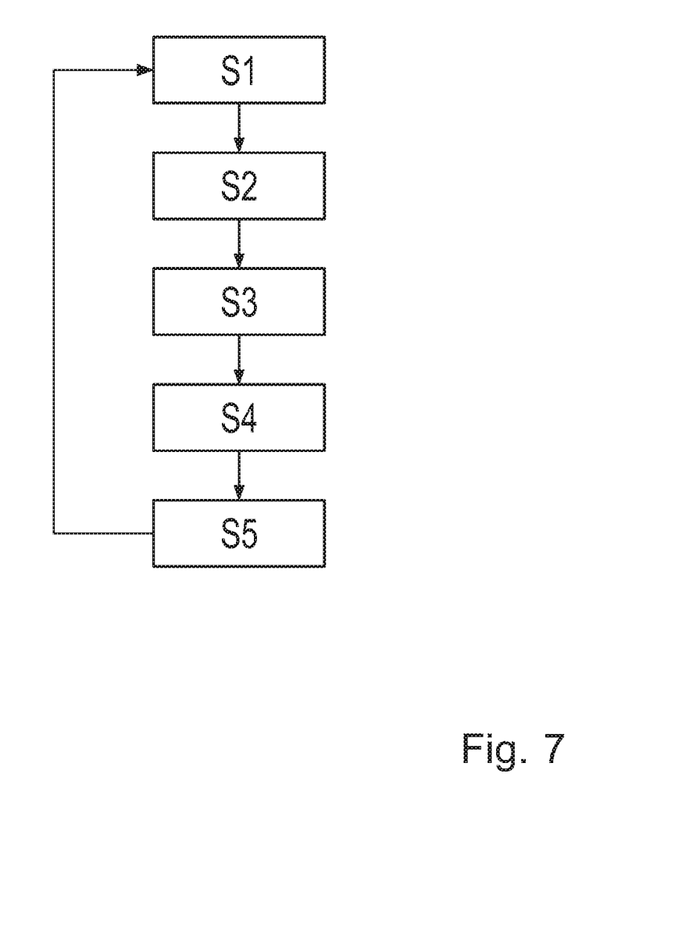
FIG. 7 shows a method according to example aspects of the invention.

FIG. 7 shows the method for cooling an electric machine 1, 1a, 1b by oil with the aid of a cooling arrangement according to example aspects of the invention.

In S1, the oil is pumped from the oil sump 29 (FIG. 4) through an oil line with the aid of an oil pump to a bearing cover 4.

From there, the oil flows via the bearing cover 4, in S2, into the distribution duct 37, and is distributed to the various cooling ducts.

In S3, the oil flows along the cooling ducts. In the process, the oil absorbs the waste heat from the rotor 27 (FIG. 1) and carries the waste heat away. Due to the proximity of the oil to the rotor 27 (FIG. 1), an efficient rotor cooling is achieved.

In S4, the heated oil flows from the cooling ducts to the annular gap 14 (FIG. 4) and into the annular gap 14 (FIG. 4).

In S5, the oil flows via the return duct 30 (FIG. 4), which is connected to the oil sump 29 (FIG. 4), into the oil sump 29 (FIG. 4) again.

As a result, a closed oil cooling circuit is achieved. The first driving toothing 15 as well as the second driving toothing 16, which protrude into the annular gap 14 (FIG. 4), can also be lubricated. As a result, a separate lubrication of the driving toothings 15, 16 can be dispensed with.

Therefore, overall, an increased service life can be brought about and an improved operation can be achieved even at high rotor temperatures.

Moreover, a cooling device (not shown) for the oil can also be arranged in the closed circuit, so that the heated oil can be cooled down again.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS 1,1a,1b electric machine
2 rotor shaft
3 transmitter wheel
4 bearing cover
5 rotor shaft outer side
6 housing
7 screws
8 annular recess
9 seal
11 hollow shaft
12 hollow shaft inner side
13 hollow shaft outer side
14 annular gap
15 first driving toothing
16 second driving toothing
17 first sealing ring
18 hollow shaft duct
19,19a,19b sealing plug
20 feed duct
21 first feed duct section
22 second feed duct section
23 bearing cover bore
24 second sealing ring
25 outlet duct
26 second front-end
27 rotor
28 press-fit connection
29 oil sump
30 return duct
31 first front-end
32 longitudinal grooves
33 contact surface
34a fixed bearing
34b floating bearing
35 through-duct
36 mounting section
37 distribution duct
38 lateral surface
39 hydraulic screw connection
40 hydraulic connecting element
41 hydraulic element
A axial direction
R radial direction
α obtuse angle
D axis of rotation
S1 first point of intersection
S2 first point of intersection
S method steps

The invention claimed is:

1. A cooling arrangement for a heat-generating, rotating component of an electric machine (1, 1a, 1b), comprising:
   a rotor shaft (2) extending in an axial direction (A) along an axis of rotation (D), a rotor shaft outer side (5) of the rotor shaft (2) extending in the axial direction (A), each of a first front-end (31) of the rotor shaft (2) and a second front-end (26) of the rotor shaft (2) positioned at a respective end of the rotor shaft (2) in the axial direction (A);
   a rotatably mounted hollow shaft (11) mounted coaxially to the rotor shaft (2) and rotationally fixed to the rotor shaft (2), a hollow shaft inner side (12) of the hollow shaft (11) facing the rotor shaft outer side (5), a hollow shaft outer side (13) of the hollow shaft (11) positioned opposite the hollow shaft inner side (12), the hollow shaft inner side (12) spaced apart from the rotor shaft outer side (5) in a radial direction (R) in order to form an annular gap (14);

at least one cooling duct for a cooling lubricant, the at least one cooling duct comprising a hollow shaft duct (18), a feed duct (20), and an outlet duct (25), wherein the hollow shaft duct (18) is positioned between the hollow shaft inner side (12) and the hollow shaft outer side (13) and extends in the axial direction (A), wherein the feed duct (20) opens into the hollow shaft duct (18) in order to feed the cooling lubricant to the hollow shaft duct (18), and wherein the outlet duct (25) extends from the hollow shaft duct (18) to the annular gap (14) in order to release the cooling lubricant flowing through the hollow shaft duct (18) into the annular gap (14).

2. The cooling arrangement of claim 1, wherein the hollow shaft duct (18) extends in the axial direction (A) parallel to the hollow shaft outer side (13).

3. The cooling arrangement of claim 1, wherein the feed duct (20) is arranged facing the first front-end (31) and the outlet duct (25) is arranged facing the second front-end (26).

4. The cooling arrangement of claim 1, further comprising a transmitter wheel (3) with a distribution duct (37) for the cooling lubricant, a first rotor shaft-facing side of the transmitter wheel (3) arranged at the first front-end (20) of the rotor shaft (2) and rotationally fixed to the first front-end (20) of the rotor shaft (2), a second side of the transmitter wheel (3) facing away from the rotor shaft (2) and positioned opposite the first rotor shaft-facing side of the transmitter wheel (3), the distribution duct (37) arranged in the transmitter wheel (3), the distribution duct (37) open toward the second side of the transmitter wheel (3).

5. The cooling arrangement of claim 4, further comprising:
   a rotationally fixed bearing cover (4) for mounting the transmitter wheel (3), the bearing cover (4) arranged on the second side of the transmitter wheel (3), the bearing cover (4) comprising a passage that extends in the axial direction (A) and is adjacent the distribution duct (37); and
   a hydraulic connecting bush (40) and a hydraulic screw connection (41), the hydraulic connecting bush (40) arranged in the passage, the hydraulic screw connection (41) clamped to the hydraulic connecting bush (40) such that the hydraulic screw connection (41) forms a fluid connection with the distribution duct (37) via the hydraulic connecting bush (40).

6. The cooling arrangement of claim 5, wherein the hydraulic screw connection (41) is L-shaped.

7. The cooling arrangement of claim 4, further comprising a rotationally fixed bearing cover (4) for mounting the transmitter wheel (3), the bearing cover (4) arranged on the second side of the transmitter wheel (3), the bearing cover (4) comprising a continuous, L-shaped bearing cover bore (23) fluidically connected to the distribution duct (37) such that the cooling lubricant is flowable into the distribution duct (37) via the bearing cover bore (23).

8. The cooling arrangement of claim 1, wherein the feed duct (20) is a continuous bore through the transmitter wheel (3) and the hollow shaft (11), the bore intersecting the hollow shaft duct (18) at a first point of intersection (S1) such that the cooling lubricant is flowable from the feed duct (20) into the hollow shaft duct (18), the continuous bore comprising a seal to block leakage of the cooling lubricant at the hollow shaft outer side (13).

9. The cooling arrangement of claim 1, wherein the outlet duct (25) is a continuous bore through the hollow shaft (11), the continuous bore intersecting the hollow shaft duct (18) at a second point of intersection (S2) such that the cooling lubricant is flowable from the hollow shaft duct (18) into the annular gap (14) via the outlet duct (25), the continuous bore comprising a seal to block leakage of the cooling lubricant at the hollow shaft outer side (13).

10. The cooling arrangement of claim 1, further comprising multiple cooling ducts distributed over a circumference of the hollow shaft (11), the multiple cooling ducts spaced equidistantly from one another.

11. The cooling arrangement of claim 1, wherein the hollow shaft outer side (13) comprises a cylindrical lateral surface.

12. The cooling arrangement of claim 11, wherein the cylindrical lateral surface comprises multiple longitudinal grooves (32) arranged in parallel to one another and extending along the axial direction (A).

13. The cooling arrangement of claim 12, wherein the multiple parallel longitudinal grooves (32) are uniformly distributed over a circumference of the hollow shaft outer side (13).

14. An electric machine (1, 1a, 1b), comprising the cooling arrangement of claim 1 and a rotor (27) mounted coaxially to the hollow shaft (11), the rotor (27) rotationally fixed to the hollow shaft (11).

15. A method for cooling the rotor in the electric machine (1, 1a, 1b) of claim 14, the method comprising:
   guiding cooling lubricant out of a cooling lubricant sump with a cooling lubricant line to a bearing cover (4);
   flowing the cooling lubricant into the distribution duct (37) via the bearing cover (4), and flowing the cooling lubricant through the distribution duct (37) to at least one cooling duct;
   flowing the cooling lubricant into the at least one cooling duct, which is fluidically connected to the distribution duct (37), and flowing the cooling lubricant through the at least one cooling duct to the annular gap (14);
   flowing the cooling lubricant into the annular gap (14), which is fluidically connected to the at least one cooling duct, and flowing the cooling lubricant through the annular gap (14) to a return duct (30); and
   flowing the cooling lubricant into the return duct (30) and guiding the cooling lubricant to the cooling lubricant sump fluidically connected to the return duct (30).

* * * * *